(12) United States Patent
Chappel

(10) Patent No.: US 7,236,940 B2
(45) Date of Patent: Jun. 26, 2007

(54) METHOD AND SYSTEM FOR ASSESSING AND PLANNING BUSINESS OPERATIONS UTILIZING RULE-BASED STATISTICAL MODELING

(75) Inventor: Oscar A. Chappel, New Port Richey, FL (US)

(73) Assignee: Perot Systems Corporation, Plano, TX (US)

(*) Notice: Subject to any disclaimer, the term of this patent is extended or adjusted under 35 U.S.C. 154(b) by 919 days.

(21) Appl. No.: 09/859,320

(22) Filed: May 16, 2001

(65) Prior Publication Data

US 2002/0174005 A1  Nov. 21, 2002

(51) Int. Cl.
*G06F 17/30* (2006.01)
(52) U.S. Cl. .................................................. 705/10
(58) Field of Classification Search .................. 705/10
See application file for complete search history.

(56) References Cited

U.S. PATENT DOCUMENTS

| | | | |
|---|---|---|---|
| 4,684,044 A | * | 8/1987 | Foster ..................... 222/386 |
| 4,713,775 A | * | 12/1987 | Scott et al. .................. 706/45 |
| 4,860,213 A | * | 8/1989 | Bonissone .................. 706/52 |
| 4,912,669 A | | 3/1990 | Iwamoto et al. |
| 4,920,499 A | | 4/1990 | Skeirik |
| 4,970,658 A | * | 11/1990 | Durbin et al. ............... 706/60 |
| 5,301,105 A | | 4/1994 | Cummings |
| 5,390,330 A | | 2/1995 | Talati |
| 5,483,443 A | | 1/1996 | Milstein |
| 5,488,714 A | | 1/1996 | Skidmore |
| 5,523,942 A | | 6/1996 | Tyler et al. |
| 5,553,282 A | | 9/1996 | Parrish et al. |
| 5,577,169 A | | 11/1996 | Prezioso |
| 5,619,709 A | | 4/1997 | Caid |
| 5,671,360 A | | 9/1997 | Hambrick et al. |
| 5,724,488 A | | 3/1998 | Prezioso |
| 5,724,983 A | | 3/1998 | Selker |
| 5,765,140 A | | 6/1998 | Knudson et al. |
| 5,772,585 A | | 6/1998 | Lavin |
| 5,784,635 A | | 7/1998 | McCallum |

(Continued)

FOREIGN PATENT DOCUMENTS

JP  2000-250888  *  9/2000

(Continued)

OTHER PUBLICATIONS

Makridakis, Spyros et al., Forecasting Methods and Applications Third Edition John Wiley & Sons, 1998, ISBN: 0-471-53233-9.*

(Continued)

*Primary Examiner*—Catherine Tarae
*Assistant Examiner*—Scott L. Jarrett
(74) *Attorney, Agent, or Firm*—Winstead PC

(57) ABSTRACT

The principles of the present invention include a system and method for assessing business activities. The method includes retrieving historical data associated with a business activity. At least one statistical model is generated based on the historical data. Knowledge is developed based on the statistical model(s). The knowledge is applied to at least one predetermined rule. Validity of the statistical model(s) is assessed based on the application of the knowledge using the predetermined rule(s). A valid statistical model is recommended to a user.

15 Claims, 10 Drawing Sheets

U.S. PATENT DOCUMENTS

| | | | |
|---|---|---|---|
| 5,794,178 A | 8/1998 | Caid | |
| 5,809,476 A | 9/1998 | Ryan | |
| 5,809,493 A * | 9/1998 | Ahamed et al. | 706/52 |
| 5,819,228 A | 10/1998 | Spiro | |
| 5,826,239 A | 10/1998 | Du et al. | |
| 5,835,897 A | 11/1998 | Dang | |
| 5,890,129 A | 3/1999 | Spurgeon | |
| 5,903,453 A | 5/1999 | Stoddard, II | |
| 5,908,383 A | 6/1999 | Brynjestad | |
| 5,916,818 A | 6/1999 | Irsch | |
| 5,924,074 A | 7/1999 | Evans | |
| 5,930,798 A | 7/1999 | Lawler | |
| 5,956,689 A | 9/1999 | Everhart, III | |
| 5,960,196 A | 9/1999 | Carrier, III et al. | |
| 6,049,794 A | 4/2000 | Jacobs | |
| 6,061,506 A | 5/2000 | Wollaston et al. | |
| 6,067,466 A | 5/2000 | Selker | |
| 6,067,541 A | 5/2000 | Raju et al. | |
| 6,073,107 A | 6/2000 | Minkiewicz et al. | |
| 6,082,776 A | 7/2000 | Feinberg | |
| 6,088,677 A | 7/2000 | Spurgeon | |
| 6,101,481 A | 8/2000 | Miller et al. | |
| 6,115,646 A | 9/2000 | Fiszman et al. | |
| 6,125,350 A | 9/2000 | Dirbas | |
| 6,137,911 A | 10/2000 | Zhilyaev | |
| 6,151,585 A | 11/2000 | Altschuler et al. | |
| 6,161,113 A | 12/2000 | Mora et al. | |
| 6,182,047 B1 | 1/2001 | Dirbas | |
| 6,266,645 B1 | 7/2001 | Simpson | |
| 6,272,678 B1 | 8/2001 | Imachi et al. | |
| 6,278,977 B1 | 8/2001 | Agrawal et al. | |
| 6,279,042 B1 | 8/2001 | Ouchi | |
| 6,292,771 B1 | 9/2001 | Huag | |
| 6,311,173 B1 | 10/2001 | Levin et al. | |
| 6,314,556 B1 | 11/2001 | DeBusk | |
| 6,336,217 B1 | 1/2002 | D'Anjou et al. | |
| 6,347,329 B1 | 2/2002 | Evans | |
| 6,353,817 B1 | 3/2002 | Jacobs | |
| 6,366,683 B1 | 4/2002 | Langlotz | |
| 6,370,511 B1 | 4/2002 | Dang | |
| 6,381,576 B1 | 4/2002 | Gilbert | |
| 6,381,610 B1 | 4/2002 | Gundewar et al. | |
| 6,411,936 B1 * | 6/2002 | Sanders | 705/10 |
| 6,415,295 B1 | 7/2002 | Feinberg | |
| 6,430,538 B1 | 8/2002 | Bacon et al. | |
| 6,484,178 B1 | 11/2002 | Julian | |
| 6,493,731 B1 | 12/2002 | Jones et al. | |
| 6,551,266 B1 | 4/2003 | Davis | |
| 6,556,964 B2 | 4/2003 | Haug | |
| 6,578,006 B1 | 6/2003 | Saito et al. | |
| 6,581,040 B1 | 6/2003 | Wright et al. | |
| 6,594,673 B1 | 7/2003 | Smith et al. | |
| 6,611,726 B1 * | 8/2003 | Crosswhite | 700/99 |
| 6,715,130 B1 | 3/2004 | Eiche et al. | |
| 6,725,287 B1 | 4/2004 | Loeb et al. | |
| 6,879,959 B1 | 4/2005 | Chapman et al. | |
| 6,901,372 B1 | 5/2005 | Helzerman | |
| 6,904,454 B2 | 6/2005 | Stickler et al. | |
| 6,999,959 B1 | 2/2006 | Lawrence et al. | |
| 7,031,930 B2 | 4/2006 | Freeman et al. | |
| 7,092,895 B2 | 8/2006 | Chappel et al. | |
| 2001/0018739 A1 | 8/2001 | Anderson | |
| 2001/0034621 A1 | 10/2001 | Kirsh et al. | |
| 2001/0037224 A1 | 11/2001 | Eldridge et al. | |
| 2001/0041992 A1 | 11/2001 | Lewis | |
| 2001/0051879 A1 | 12/2001 | Johnson | |
| 2001/0051880 A1 | 12/2001 | Schurenberg | |
| 2002/0007284 A1 | 1/2002 | Schurenberg | |
| 2002/0010595 A1 | 1/2002 | Kapp | |
| 2002/0022972 A1 | 2/2002 | Costello | |
| 2002/0035486 A1 | 3/2002 | Huyn | |
| 2002/0035491 A1 | 3/2002 | Dombroski | |
| 2002/0040359 A1 | 4/2002 | Green et al. | |
| 2002/0046346 A1 | 4/2002 | Evans | |
| 2002/0052551 A1 | 5/2002 | Sinclair | |
| 2002/0052760 A1 | 5/2002 | Munoz | |
| 2002/0052858 A1 * | 5/2002 | Goldman et al. | 706/15 |
| 2002/0069056 A1 | 6/2002 | Nofsinger | |
| 2002/0069057 A1 | 6/2002 | Kapust | |
| 2002/0069079 A1 | 6/2002 | Vega | |
| 2002/0069085 A1 | 6/2002 | Engel | |
| 2002/0069089 A1 | 6/2002 | Larkin | |
| 2002/0070226 A1 | 6/2002 | Liff | |
| 2002/0077849 A1 | 6/2002 | Baruch | |
| 2002/0077945 A1 | 6/2002 | Leymann et al. | |
| 2002/0077994 A1 | 6/2002 | Dombroski | |
| 2002/0082825 A1 | 6/2002 | Rowlandson | |
| 2002/0087358 A1 | 7/2002 | Gilbert | |
| 2002/0087533 A1 | 7/2002 | Norman | |
| 2002/0091552 A1 | 7/2002 | Dombroski | |
| 2002/0093189 A1 | 7/2002 | Krupa | |
| 2002/0099686 A1 | 7/2002 | Schwartz | |
| 2002/0100762 A1 | 8/2002 | Liff | |
| 2002/0103680 A1 | 8/2002 | Newman | |
| 2002/0107452 A1 | 8/2002 | Kwong | |
| 2002/0111826 A1 | 8/2002 | Potter | |
| 2002/0116466 A1 | 8/2002 | Trevithick et al. | |
| 2002/0120466 A1 | 8/2002 | Finn | |
| 2002/0124002 A1 | 9/2002 | Su | |
| 2002/0128816 A1 | 9/2002 | Haug | |
| 2002/0128868 A1 | 9/2002 | Lonski | |
| 2002/0138306 A1 | 9/2002 | Sabovich | |
| 2002/0138649 A1 | 9/2002 | Cartmell | |
| 2002/0147615 A1 | 10/2002 | Doerr | |
| 2002/0147617 A1 | 10/2002 | Schoenbaum | |
| 2002/0147710 A1 | 10/2002 | Hu | |
| 2002/0148893 A1 | 10/2002 | Walsh | |
| 2002/0150966 A1 | 10/2002 | Muraca | |
| 2002/0156078 A1 | 10/2002 | Comings | |
| 2002/0161606 A1 | 10/2002 | Bennett | |
| 2002/0165735 A1 | 11/2002 | Stangel | |
| 2002/0165738 A1 | 11/2002 | Dang | |
| 2002/0165739 A1 | 11/2002 | Guyan | |
| 2002/0169737 A1 | 11/2002 | Armstrong et al. | |
| 2002/0169771 A1 | 11/2002 | Melmon | |
| 2002/0170565 A1 | 11/2002 | Walker | |
| 2002/0173875 A1 | 11/2002 | Wallace | |
| 2002/0173971 A1 | 11/2002 | Stirpe | |
| 2002/0173987 A1 | 11/2002 | Dang | |
| 2002/0173988 A1 | 11/2002 | Dang | |
| 2002/0173989 A1 | 11/2002 | Dang | |
| 2002/0173992 A1 | 11/2002 | Dang | |
| 2002/0178161 A1 | 11/2002 | Brezin et al. | |
| 2002/0183626 A1 | 12/2002 | Nordstrom | |
| 2002/0188452 A1 | 12/2002 | Howes | |
| 2002/0193667 A1 | 12/2002 | McNair | |
| 2002/0194221 A1 | 12/2002 | Strong | |
| 2002/0195488 A1 | 12/2002 | Walsh | |
| 2002/0198885 A1 | 12/2002 | Streepy | |
| 2003/0009239 A1 | 1/2003 | Lombardo | |
| 2003/0009357 A1 | 1/2003 | Pish | |
| 2003/0009359 A1 | 1/2003 | Weidner | |
| 2003/0018595 A1 | 1/2003 | Chen | |
| 2003/0023473 A1 | 1/2003 | Guyan | |
| 2003/0027223 A1 | 2/2003 | Muraca | |
| 2003/0028404 A1 | 2/2003 | Herron | |
| 2003/0032069 A1 | 2/2003 | Muraca | |
| 2003/0032871 A1 | 2/2003 | Selker | |
| 2003/0033169 A1 | 2/2003 | Dew | |
| 2003/0036924 A1 | 2/2003 | Rosen | |
| 2003/0049701 A1 | 3/2003 | Muraca | |
| 2003/0050804 A1 | 3/2003 | Hendershot | |
| 2003/0050825 A1 | 3/2003 | Gallivan | |
| 2003/0055531 A1 | 3/2003 | Liff | |

| | | |
|---|---|---|
| 2003/0055679 A1 | 3/2003 | Soll |
| 2003/0060688 A1 | 3/2003 | Ciarniello |
| 2003/0061096 A1 | 3/2003 | Gallivan |
| 2003/0069756 A1 | 4/2003 | Higginbotham |
| 2003/0069760 A1 | 4/2003 | Gelber |
| 2003/0074218 A1 | 4/2003 | Liff |
| 2003/0074226 A1 | 4/2003 | Rostron |
| 2003/0074228 A1 | 4/2003 | Walsh |
| 2003/0083903 A1 | 5/2003 | Myers |
| 2003/0101089 A1 | 5/2003 | Chappel et al. |
| 2003/0130991 A1 | 7/2003 | Reijerse et al. |
| 2003/0149594 A1 | 8/2003 | Beazley et al. |
| 2003/0167184 A1 | 9/2003 | Kole |
| 2003/0191667 A1 | 10/2003 | Fitzgerald et al. |
| 2003/0208379 A1 | 11/2003 | Haskey et al. |
| 2004/0006495 A1 | 1/2004 | Dudley |
| 2004/0073811 A1 | 4/2004 | Sanin |
| 2004/0078247 A1 | 4/2004 | Rowe et al. |
| 2004/0122709 A1 | 6/2004 | Avinash et al. |
| 2005/0102169 A1 | 5/2005 | Wilson |
| 2005/0137912 A1 | 6/2005 | Rao et al. |

FOREIGN PATENT DOCUMENTS

| | | | |
|---|---|---|---|
| JP | 2001-022729 | * | 1/2001 |

OTHER PUBLICATIONS

Turban, Efraim et al., Decision Support Systems, and Intelligent Systems—Fifth Edition Prentince Hall, Inc. 1998, ISBN: 0-13-740937-0.*
Bell et al., The Forecasting Report Sep. 1999.*
Armstrong, Scott J., Strategic Planning and Forecasting Fundamentals 1983, Excerpt from Albert, Kenneth, The Strategic Management Handbook, McGraw Hill.*
Armstrong, Scott J. et al., Forecasting for Marketing Excerpt from Hooley et al., Quantititive Methods in Marketing, Second Edition, 1999, pp. 92-119.*
Delurgio, Steve, Guide to Forecast Pro from Windows Retrieved from forecast.umkc.edu Apr. 19, 2005.*
Forecast Pro Product Brochure Retreived Apr. 19, 2005 from Archive.org—www.forecastpro.com.*
Hain, Chaman, Benchmarking Forecasting Software Packages and Systems Institute of Business Forecasting Research Report 3, Retreived Apr. 19, 2005 from Archive.org—www.forecastpro.com.*
Armstrong, J. Scott et al., Principles of Forecasting—A Handbook for Researchers and Practitioners Springer, Apr. 2001, ISBN: 0792374010.*
Armstrong J. Scott et al., Principles of Forecasting—Web Site Jan. 2001, www.passig.com/pic/ForecastingHandbook.htm.*
ForecastPro.com—Home, Product Description and Product Review web pages Nov. 2000, Retreived Apr. 15, 2005 from Archive.org.*
Hollandeer, Geoffrey, ForecastPro Presages Data InfoWorld, Feb. 21, 2000.*
Stellwagen, Eric, New Version of Forecast Pro Greatly Expand Capabilities, Performance and Ease of Use Business Forecast Systems, Inc., Press Release, Feb. 14, 2000.*
Coffee, Peter, Forecast Pro XE Sharpens Users' View PC Week Labs, Feb. 15, 2000.*
Forecast Pro Product Brochure: Fast, easy, accurate forecasting Business Forecast Systems, 2000.*
Khairy A.H. Kobbacy et al., Towards the development of an intelligent inventory management system Integrated Manufacturing Systems, 1999, vol. 10, No. 6.*
Walter Reitman et al., Artificial Intelligence Applications for Business (Computer-based information systems in organizations) Ablex Publishing, Jan. 1984, ISBN: 0893912204.*
Lamma, Evelina et al., AIIA 99:Advances in Artificial Intelligence Lecture Notes in Artificial Intelligence, vol. 1792, ISBN: 3-540-67350-4.*
Jae K Shim, Strategic Business Forecasting Publisher CRC Press, Jan. 28, 2000, ISBN 1574442511.*
Partridge, Derek et al., Artificial Intelligence and Business Management Ablex Publishing, 1992, ISBN: 0-89391-835-0.*
K. S. Leung and W. Lam, Fuzzy concepts in expert systems IEEE Comput. Mag., vol. 21, No. 9, pp. 43-56, 1988.*
Harrison, H.C. et al., An Intelligent Business Forecasting System CSC '93, Proceedings of the 1993 ACM Conference on Computer Science, Feb. 16-18, 1993, pp. 229-236.*
Autobox 5.0 for Windows User's Guide & Reference Guide Automatic Forecasting Systems, Inc., Dec. 1999.*
SmartSoftware.com Web Pages Smart Software, Inc. May 2000—Jul. 2001, Retrieved from Archive.org Dec. 20, 2005.*
Marvin, Bryan, Predicting the future proves easy with Forecast Pro Planner PC Week, Sep. 1, 1987, vol. 4, No. 35.*
Mentzer, John et al., Evaluation a Decision Support Forecasting System Idustrial Marketing management, vol. 18, 1989, pp. 313-323.*
Makridakis, Spyros, Accuracy measures: Theoretical and practical concerns International Journal of Forecasting, vol. 9, No. 4, Dec. 1993, Abstract.*
Lupul, Max, Forecast Pro for Windows, version 1.1: What does it do? The Journal of Services Marketing, vol. 7, No. 4, 1993, pp. 67-69.*
Hollander, Geoffrey, Forecast Pro preasges data InfoWorld, Feb. 21, 2000, vol. 22, No. 8, pp. 59-60.*
Libert, G., The M-Competition with a Fully Automatic Box-Jenkins Procedure Journal of Forecasting, Jul.-Sep. 1984, vol. 3, No. 3, pp. 325-328.*
Texter, Pamela, Automatic Forecasting of Multivariate Time Series Pennsylvania University, 1986, AAT 8705423, Abstract.*
Tashman, Leonard et al. Automatic Forecasting Software: A Survey and Evaluation International Journal of Forecasting, Aug. 1991, vol. 7, No. 2, Abstract.*
Pesaran M. et al., A generalzed R squared criterion for regression models estimated by the instrumental variable method Econometrica, Vo. 62, No. 3, May 1994, Abstract.*
Nagata, Yashushi et al., Comparison of Determination Coefficient Estimators in the Linear Regression Analysis Hinshitsu, Vo. 27, No. 2, 1997, Abstract.*
Ronchetti, Elvezio, Regression and Time Series Model Selection Journal of American Statistical Association, Sep. 2000, vol. 95, No. 451, pp. 1008-1009.*
Zheng, Beiyao, Summarizing the goodness of fit of generalized linear models for longitudinal data Journal of Statistics in Medicine, vol. 19, No. 10, 2000, Abstract.*
Chatfield, Chris, Time-Series Forecasting Chapman & Hall/CRC, Oct. 25, 2000, ISBN: 1584880635.*
Makridakis, Spyros et al., Forecasting Methods and Applications—Third Edition John Wiley & Sons, 1998, ISBN 0-471-53233-9.*
McQuarrie, Allan D.R. et al., Regression and Time Series Model Selection World Scientific, Aug. 1998, ISBN: 981023242X.*
Hill, G.W. et al., Automatic Box-Jenkins Forecasting The Journal of the Operational Research Society, vol. 31, No. 5, May 1980, pp. 413-422.*
Park, Kwan Hee, Development and evaluation of a prototype expert system for forecasting models Mississippi State University, 1990, AAT 9109003, Abstract.*
Al-Jabri, Ibrahim Muhammad, Expert system for forecasting Illinois Institute of Technology, 1991, AAT 9222168, Abstract.*
Wang, Liang et al., An Expert System For Forecasting Model Selection First IEEE Conference on Control Applications, Sep. 13-16, 1992, pp. 704-709.*
Collopy, Fred, Rule Based Forecast: Development and Validation of an Expert Systems Approach to Combining Time Series Extrapolation, Management Science, vol. 38, No. 10, 1992, pp. 1394-1414.*
Rust, Roland T. et al., Model Selection Criteria: An Investigation of Relative Accuracy, Posterior Probabilities, and Combination Criteria, Management Science, vol. 41, No. 2, Feb. 1995, pp. 322-333.*
Digital Business Office Architecture; 2001 The Technical Resource Connection, Inc.; 1 page.
Tips for Clean Claims for Institutional Providers; 3 Pages.
Health Claims for Equivalent Encounter Information; HCFA Uniform Bill-92 (UB-92), Version 4.1; 28 Pages.

New Area PPO Puts Emphasis on Claims Service; Alan Moorse; Capital District Business Review; 2 Pages.
Object Oriented Programming; A Guide for the Beginner- from Modula-2 to Java; 9 Pages.
Rules Based Systems Fuzzy Logic Expert Systems Forwards and Backwards Chaining Pattern Matching Imperative and Declarative Programming; Gaurav Sharma et al.; 13 Pages.
AMR Health's AVS Reimbursement System; 3 Pages.
Introduction; 2 Pages.
Designing an Expert System; 1 Page.
Expert System Architecture; 2 Pages.
Choosing a Problem; 1 Page.
Knowledge Engineering; 1 Page.
Exam-like Questions; 1 Page.
Rules and Expert Systems; 1 Page.
A Simple Example; 2 Pages.
Explanation Facilities; 2 Pages.
More Complex Systems; 1 Page.
An Expert System Shell in Prolog: 4 Pages.
MYCIN: A Quick Case Study; 3 Pages.
Knowledge-Based System; 1 Page.
Expert System; 1 Page.
Inference Engine; 1 Page.
Inference Ruse; 1 Page.
Object Code; 1 Page.
Forward Chaining Systems; 3 Pages.
Backward Chaining Systems; 2 Pages.
Forwards vs. Backwards Reasoning; 1 Page.
Uncertainty in Rules; 1 Page.
U.S. Appl. No. 10/336,104, filed Jan. 3, 2003, Chappel.
U.S. Appl. No. 10/690,258, filed Oct. 21, 2003, Chappel.
U.S. Appl. No. 09/916,088, filed Jul. 26, 2001, Creel et al.
U.S. Appl. No. 10/690,257, filed Oct. 21, 2003, Chappel.
Juan C. Nogueira et al., "A Formal Risk Assessment Model for Software Evolution", US Army Research Office under grant #38690-MA & grant #40473-MA.
Michael K. Daskalantonakis, "A Practical View of Software Measurement and Implementation Experiences Within Motorola", IEEE Transactions on Software Engineering, vol. 18, No. 11 Nov. 1992, pp. 998-1010.
Edward F. Weller, "Using Metrics to Manage Software Projects", IEEE, Sep. 1994, pp. 27-33.
Dick B. Simmons et al., "Software Measurement: A Visualization Toolkit for Project Control and Process Improvement", Prentice Hall, Nov. 1997, ISBN-0-13-840695-2.
"Caliber—Requirements Management (RM)", Http://web.archive.org/web/20000304023307/www.tbi.com/caliberrm/index.html.
H.P. Schultz, "Software Management Metrics", Mitre Corp. Report No. M88-1, May 1988 (abstract).
Karl E. Wiegers,"Automating Requirements Management", Process Impact, 1999, pp. 1-6.
Bruce Abbott, "Requirements Set the Mark", Info World, Mar. 5, 2001, pp. 45-46.
Andy Feibus, "Manage Your Project's Requirements", Information Week, Oct. 19, 1998, pp. 100-108.
QSS Delivers Industry's First Enterprise-Wide Requirements Management Suite for E-Business, QSS News Archive, Mar. 22, 2000.
D. W. Cordes, "Evaluation Method for User Requirements Documents", Information and Software Technology, May 1989, vol. 31, issue 4, pp. 181 (8 pages) (abstract).
J. Gyorkos, "Measurements in Software Requirements Specification Process", Microprocessing and Microprogramming, Dec. 1994, vol. 40, issue 10-12, p. 893 (4 pages) (abstract).
Rita Jean Costello, "Metrics for Requirements Engineering", California State University, 1994, 211 pages (abstract).
Jeanne Minahan Robinson, "Risk Assessment in Software Requirements Engineering: an Event Driven Framework", George Mason University, 1995, 177 pages (abstract).
Donald M. York, "An Early Indicator to Predict Requirements Volatility", George Mason University, 2001, 235 pages (abstract).
D. Pfahl et al., "Using Simulation to Analyze the Impact of Software Requirement Volatility on Project Performance", Information and Software Technology, Nov. 15, 2000, vol. 42, issue 14, p. 1001.
Capers Jones, "Strategies for Managing Requirements Creep", Software Productivity Research, Jun. 1996, pp. 92-94.
Adam A. Porter et al., "Empirically Guided Software Development Using Metric-Based Classification Trees", IEEE Software, Mar. 1990, pp. 46-54.
Marco Carrer et al., "An Annotation Engine for Supporting Video Database Population", Multimedia Tools and Applications 5, Kluwer Academic Publishers, 1997, pp. 233-258.
Robert Gaizauskas et al., "Information Extraction: Beyond Document Retrieval", Computational Linguistics and Chinese Language Processing, vol. 3, No. 2, Aug. 1998, pp. 17-60.
Gian P. Zarri, "NKRL, a Knowledge Representation Language for Narrative Natural Language Processing", 1996, pp. 1032-1035.
"FastEMC 6.2: UB92 Electronic Claim Submission System", fPTechnologies, Oct. 31, 1999, manual.
R. Shaker et al., "A Rule Driven Bi-Directional Translation System for Remapping Queries and Result Sets Between a Mediated Schema and Heterogeneous Data Sources", pp. 1-5.
Daniel T. Heinze et al., "LifeCode—A Deployed Application for Automated Medical Coding", Al Magazine, Summer 2001, pp. 1-12.
Peter Jackson Benson, "A Field Study of Communication Patterns in an Organization Using the Negopy Computerized Network Analysis Technique", AAT 8728711, 1987, 223 pages (abstract).
Mark Ackerman et al., "Social Activity Indicatiors: Interface Components for CSCW Systems", Nov. 14-17, 1995, pp. 159-168.
"Chapter Four: Managing Core Competencies of the Corporation", Tactic #17, Organizational Network Mapping, The Advisory Board Company, 1996, pp. 393-410.
Valdis Krebs, "Organizational Network Analysis", Feb. 2001, Orgnet.com.
Economist.com, "The Big Picture", Jan. 4, 2001, Geneva.
Rainer Puittinen et al., "Measuring and Visualizing Information Transfer in Networked Collaboration", International Journal of Communication Systems, 1999, vol. 12, No. 85, pp. 85-101.
Eero Byckling et al., "Spin-offs from CERN and Case of TuoviWDM", Technovation, 2000, vol. 20, No. 2, pp. 71-80.
Eero Eloranta et al., "Improved Project Management Through Improved Document Management", Computers in Industry, 2001, vol. 45, pp. 231-243.
Marc A. Smith et al., "Visualization Components for Persistent Conversations", CHI Mar.-Apr. 2001, vol. 3, No. 1, pp. 136-143.
Mikko Vuoikoski, "Making Intercorporate Project Communications Work Solutions for the International Market Place", Single Source OY, pp. 1-13.
Ari-Pekka Hameri, "Project Management in a long-term and Global One-of-a-Kind Project", International Journal of Project Management, 1997, vol. 15, No. 3, pp. 151-157.
Mokhtar Amami et al., "Project Management and Communication of Product Development Through Electronic Document Management", Project Management Journal, Jun. 2000, vol. 31, No. 2, pp. 6-19.
David Krackhardt, "Social Networks and the Liability of Newness for Managers", Journal of Organizational Behavior, vol. 3, 1996, pp. 159-173.
Mark D. Morelli et al., "Predicting Technical Communication in Product Development Organizations", IEEE Transactions of Engineering Management, vol. 42, No. 3, Aug. 1995, pp. 215-222.
Ralph Katz et al., "Communication Patterns, Project Performance, and Task Characteristics: An Empirical Evaluation and Integration in an R&D Setting", Organizational Behavior and Human Performance, Apr. 1979, vol. 23, iss. 2, p. 139 (abstract).
David Krackhardt et al., "Informal Networks: The Company Behind the Chart", Harvard Business Review, Jul. 1993, vo. 74, iss. 4, p. 104 (abstract).
Stanley Wasserman et al., "Social Network Analysis: Methods and Applications", Cambridge University Press, 1994.
James Gregory Jones, "A Study of Communications Between Subject Matter Experts and Individual Students in Electronic Mail Contexts", Dissertation, University of Texas at Austin, May 2001.
Mehul A. Shah, "ReferralWeb: A Resource Location System Guided by Personal Relations", Massachusetts Institute of Technology, May 1997.

Dick B. Simmons, "Manager Associate", IEEE, Transactions on Knowledge and Data Engineering, vol. 5, No. 3, Jun. 1993, pp. 426-438.

Dick B. Simmons, "A Win-Win Metric Based Software Management Approach", IEEE Transactions on Engineering Management, vol. 39, No. 1 Feb. 1992, pp. 32-41.

Dick B. Simmons, "Communications: A Software Group Productivity Dominator", Software Engineering Journal, Nov. 1991, pp. 454-462.

Ari-Pekka Hameri et al., "Distributed New Product Development Project Based on Internet and World-Wide Web: A Case Study", Product Innovation Management, 1997, vol. 14, pp. 77-87.

Laura Garton et al., "Studying On-Line Social Networks", Chapter Four of "Doing Internet Research", Steven Jones Editor, Sage Publications, 1999, pp. 75-105.

Ali A. Shah et al., "The Production of Accurate Construction Cost Estimates in Saudi Arabia", Cost Engineering, Aug. 1992, vol. 34, No. 8, pp. 15-24.

Raymond A. Paul et al., "Software Metrics Knowledge and Databases for Projected Management", IEEE Transactions on Knowledge and Data Engineering, vol. 11, No. 1, Jan./Feb. 1999, pp. 255-264.

Ching-Seh Wu, "Software Project Plan Tracking Intelligent Agent", Dissertation, Texas A&M University, Dec. 2000.

Mario Alberto Garcia Espinosa, "Intelligent Agents Applied to Software Management", Texas A&M University, Dissertation, Aug. 1997.

Rational RequistiePro: Product Overview, Rational.com, retrieved from Archive.org.

Rational RequisitePro—User's Guide Version 4.5, Rational, 1999.

McCord, Kent R. et al., "Managing the Integration Problem in Concurrent Engineering", MIT Sloan School of Management, Aug. 1993, pp. 1-34.

Thomas, Stephen Richard, "An Assessment Tool for Improving Project Team Communications", Dissertation, University of Texas at Austin, Dec. 1996, 80 pages.

Sosa, Manuel E. et al., Understanding the Effects of Product Architecture on Technical Communication in Product Development Organizations, Massachusetts Institute of Technology, Sloan School of Management Working Paper, Aug. 2000 (pp. 1-34).

Allen, Thomas, "Architecture and Communication Among Product Development Engineers", Proceedings of the IEEE Management Society, 2000 (pp. 153-158).

* cited by examiner

METHOD AND SYSTEM FOR ASSESSING AND PLANNING BUSINESS OPERATIONS UTILIZING RULE-BASED STATISTICAL MODELING

BACKGROUND OF THE PRESENT INVENTION

1. Field of the Invention

The present invention relates generally to business assessment tools, and more particularly, but not by way of limitation, to a method and system for assessing and planning business operations utilizing rule-based statistical modeling.

2. Description of the Related Art

Statistical analysis has long been used to analyze past events and predict future trends based on the past events. Statisticians often develop statistical models that are used in performing the statistical analysis. Developing and applying such statistical models is technically difficult, requires a great deal of understanding, and is often a trial and error process. Furthermore, interpretation of the results to determine validity of the statistical models requires significant conceptual analysis and expertise.

Statistical analysis may be utilized by businesses that are interested in improving their ability to assess their current fiscal state and predict future activities. For example, businesses that produce consumer goods are interested in determining production and inventory requirements to meet future market demands. Data representative of past events, such as sales, advertising efforts, pricing, etc., may be utilized by the statistician in developing the statistical models.

Since the development of computers, software tools have become a significant asset for statisticians in developing statistical models for businesses. However, these software tools are limited in functionality and intelligent features. Some software tools provide time-series analysis capabilities, but do not support regression analysis. High-end spreadsheet programs provide statistical analysis functions, such as regression and analysis of variance, but rely on an operator to (i) understand the statistical analysis functions, (ii) know how to apply the functions, and (iii) interpret results of the statistical analysis functions. For example, in the case of regression analysis, the operator needs to evaluate a resulting correlation coefficient, and determine whether the correlation coefficient indicates that a relationship between two parameters (e.g., sales and pricing) is strong enough to warrant use of a regression model in further analyses. In a case of performing analysis of variance, once a statistical tool has calculated the F-value for the analysis of variance (the quotient of the total sum of squares divided by the error sum of squares), the operator is required to compare the F-value to a corresponding value accessed from a table of statistics. This comparison provides an assessment of the significance of the variance and serves as the indication that the variance is either due to chance or some other factor that must be determined through further analysis.

From the above examples, it should be understood that statistical analysis is non-trivial. Initially, the statistician must first determine useful parameters or historical data for assessing and predicting a future trend. Secondly, the statistician must utilize multiple statistical tools and understand how to apply the statistical tools to develop a statistical model. Thirdly, the statistician must interpret results produced by the statistical tools to determine whether the developed statistical model is valid. Fourthly, if the statistical model is invalid, then the statistician must determine whether alternative statistical models can be utilized, where each of the alternative statistical models have different results that may have to be analyzed in different ways to determine if the alternative model(s) are valid. Because of the complexity involved in producing a valid statistical model, in general, only highly skilled statisticians are capable of performing such work.

SUMMARY OF THE INVENTION

To overcome the problems of requiring a highly skilled statistician to develop statistical models and determine their validity, an integrated statistical modeling package has been developed that uses rule-based analysis techniques to aid in determining validity of a selected analytical model. The rule-based integrated statistical modeling package may utilize correlation coefficients to assess the level of confidence in the generated model, and, based on rule evaluation, recommend whether the statistically generated mathematical model is valid for use in further analysis and/or prediction of business activities, for example. Because of the combination of the various statistical tools and predetermined rules, the system may be semi or fully automated. Furthermore, such an integrated package may allow the statistician to reduce analysis time and perform other, more creative tasks.

The principles of the present invention include a system and method for assessing business activities. The method includes retrieving historical data associated with a business activity. At least one statistical model is generated based on the historical data. Knowledge is developed based on the statistical model(s). The knowledge is applied to at least one predetermined rule. Validity of the statistical model(s) is assessed based on the application of the knowledge using the predetermined rule(s). A valid statistical model is recommended to a user.

Another embodiment includes a system for assessing data. The system includes a statistics component for performing statistical analysis on historical data. At least one statistical model component is coupled to the statistics component, said at least one statistical model component generating at least one statistical model. An analyst component is coupled to the statistics component, where the analyst component initiates the statistics component to perform the statistical analysis on the historical data. An inference engine is coupled to said analyst component, and a database includes at least one rule, the rule(s) being applied by said inference engine to assess validity of the statistical model(s).

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE DRAWINGS

Figure 1A:
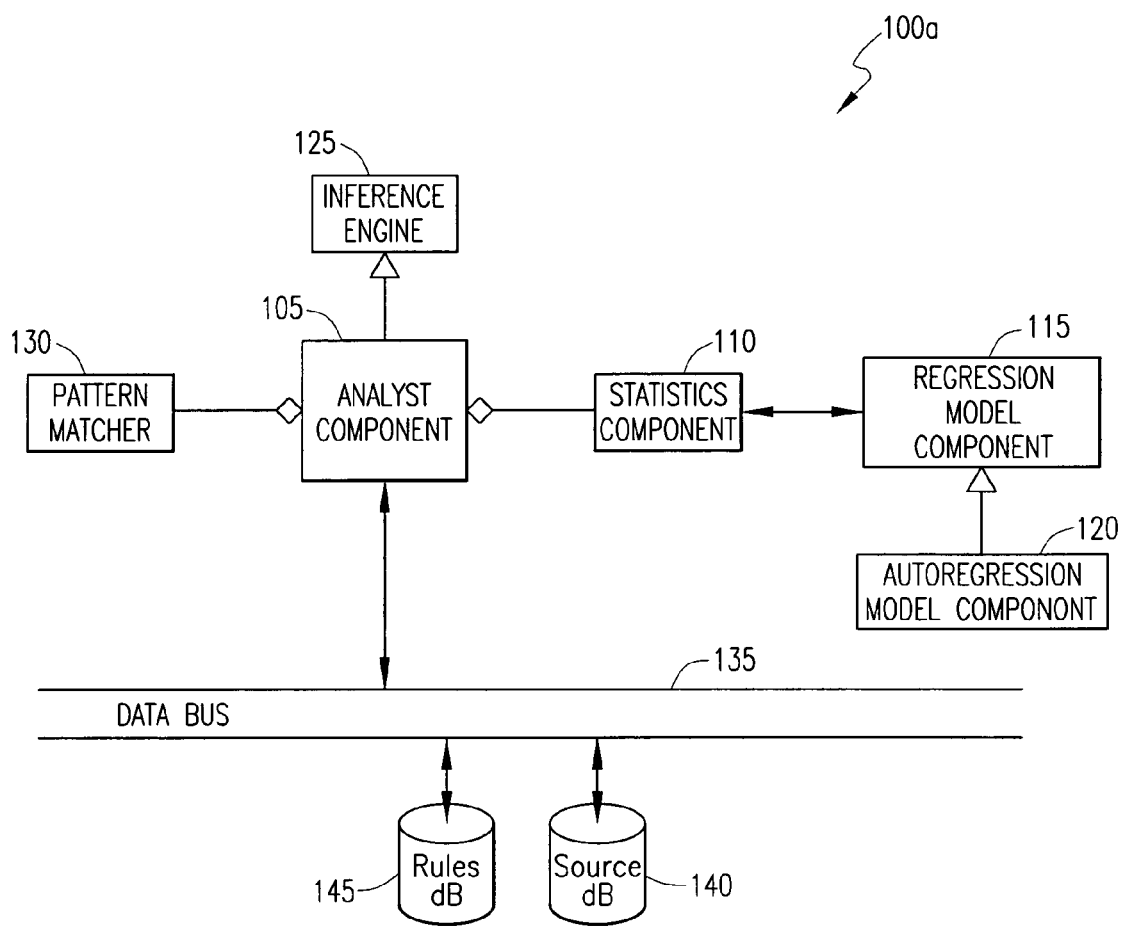
FIG. 1A is an exemplary block diagram of an integrated statistical modeling package according to the principles of the present invention.

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Planning is a fundamental business operation. Planning analysts, often statisticians, are tasked to develop credible analyses to assist planners in the development of strategic, operational, and tactical business plans. Planning provides businesses a roadmap that can be followed to attain competitive success. However, planning requires that the analyst have the ability to (i) identify significant events from the past that may have impacted the business, (ii) understand the nature of the impact of the events, (iii) translate that understanding into forecasts, and (iv) provide a confidence or certainty factor in those forecasts. Planning is also fraught with uncertainty and risk as a seemingly minor event from the past may have significant implications on future business, and an apparently significant event may prove to be of no importance whatsoever.

To assist the analyst in planning operations, an integrated statistical modeling package has been developed to provide an operator with well-defined, statistical modeling tools employing rule-based analysis methods. The integrated statistical modeling package is capable of automatically analyzing historical data, such as business data, and generating and recommending mathematical models that can be utilized by the operator to make predictions as to future business trends.

Predetermined rules are defined to assist in assessing and recommending valid statistical models. For example, a linear regression may be performed to determine if two different historical data elements or categories (e.g., advertising and sales) have a dependency relationship. If a dependency relationship is not substantiated through calculation and assessment of the correlation coefficient from the regression using the predetermined rules, a non-linear regression model may be generated to further determine whether a dependency or strength of the relationship in the historical data exists. If, based on the predefined rules, dependency is found, then an autocorrelation may be performed on the independent variable used in the regression model. This autocorrelation assessment may then be used in conjunction with approximately defined rules to determine if the values of the independent variable used in the regression are dependent on earlier values of the same variable or if the data are random, whereupon a random model may be applied.

Based on the predetermined rules, alternative models may be investigated to determine a statistical model offering the highest explanatory capabilities. If any of the statistical models are considered valid, then the modeling package recommends at least one statistical model. An assessment of the certainty that the model provides valid results for forecasting may be further provided by the modeling package. The operator may then utilize the valid model(s) to create forecasts of future business trends.

FIG. 1A shows an integrated statistical modeling package 100A that is rule-based. As shown, the integrated statistical modeling package 100A includes software tools and data repositories or databases.

The software tools include an analyst component 105, a statistics component 110, a regression model component 115, an autoregression model component 120, an inference engine 125, and a pattern matcher 130. The software tools provide both statistical modeling and analysis for the integrated statistical modeling package 100a. The software tools are preferably object-oriented coded, but may be coded using non-objected-oriented programming techniques.

A data bus 135 operates on the computing device (not shown) to provide the software tools access to the databases. Multiple databases may be utilized, a source database 140 and rules database 145. The source databases 140 includes historical information or data of a business, for example. The rules database 145 includes predetermined rules used to process or analyze results from the statistical analysis performed by the software tools. Additionally, the rules database 145 may include additional knowledge, facts and assertions, that is generated by the software tools. Alternatively, the rules database may be formed of component databases, one or more for the rules and one or more database for the knowledge.

In operation, the analyst component 105 is used as a driver for the other software tools. In other words, the analyst component 105 coordinates the integrated statistical modeling package 105 by associating statistical modeling (e.g., statistics component 110) with assessment tools (e.g., analyst component 105). The analyst component 105 directs the statistics component 110 to provide knowledge from the historical data and then directs the inference engine 125 to utilize the knowledge.

The statistics component 110 generates facts and assertions. A fact is defined as something that is known, the fact cannot be proven false. An assertion is defined as something believed to be true, but can be proven false. The statistics component 110 interfaces with the regression model component 115 and the autoregression model component 120 to perform statistical analysis on the historical information stored in the source database 140. Once the statistics component 110 has received statistical results and assessments from the regression model 115 and/or the auto regression model components 120, and/or generated knowledge based on the statistical results, the statistics component 110 delivers the knowledge and/or statistical results to the analyst component 105.

The regression model component 115 (i) populates regression parameters of the regression model(s) with data based on the historical information, (ii) calculates regression models, and (iii) generates knowledge in the form of an assertion. As an example of operation of the regression model component 115, dependent variables parameters may be found to be linearly correlated to independent variables with a correlation of 0.85. If a rule defines a correlation greater than 0.75 to be strong enough to use the linear regression model for forecasting purposes, then the regression model generated by the regression model component 115 is considered valid. An assertion suggests that the independent and dependent variables are correlated and provide for a valid linear regression model. As understood in the art, regression determines the amount of influence independent variables have on dependent variables (e.g., sales and advertising), and autoregression determines the amount of impact preceding values have on succeeding values on a single variable (e.g., sales prediction).

The inference engine 125 utilizes rules and knowledge to assess or interpret validity of statistical models, including linear, non-linear, and random models. The inference engine receives the rules from the rules database 145, receives knowledge from a knowledge database, and applies results from the statistics component 110 to the rules and knowledge. Based on results from the inference engine 125, the analyst component 105 may recommend and publish the statistical model(s).

The pattern matcher 130 is a general purpose tool to create and apply patterns of information. The pattern matcher does not perform calculations, but rather selects a pattern and places or removes the pattern from the database. Further, the pattern matcher 130 can generate assertions that the inference engine 125 may use. For example, the pattern matcher 130 may create a pattern having certain characteristics to determine if the pattern is produced by an autoregression model. If the created pattern matches a pattern produced by the autoregression model, a new piece of knowledge may be created.

Figure 1B:
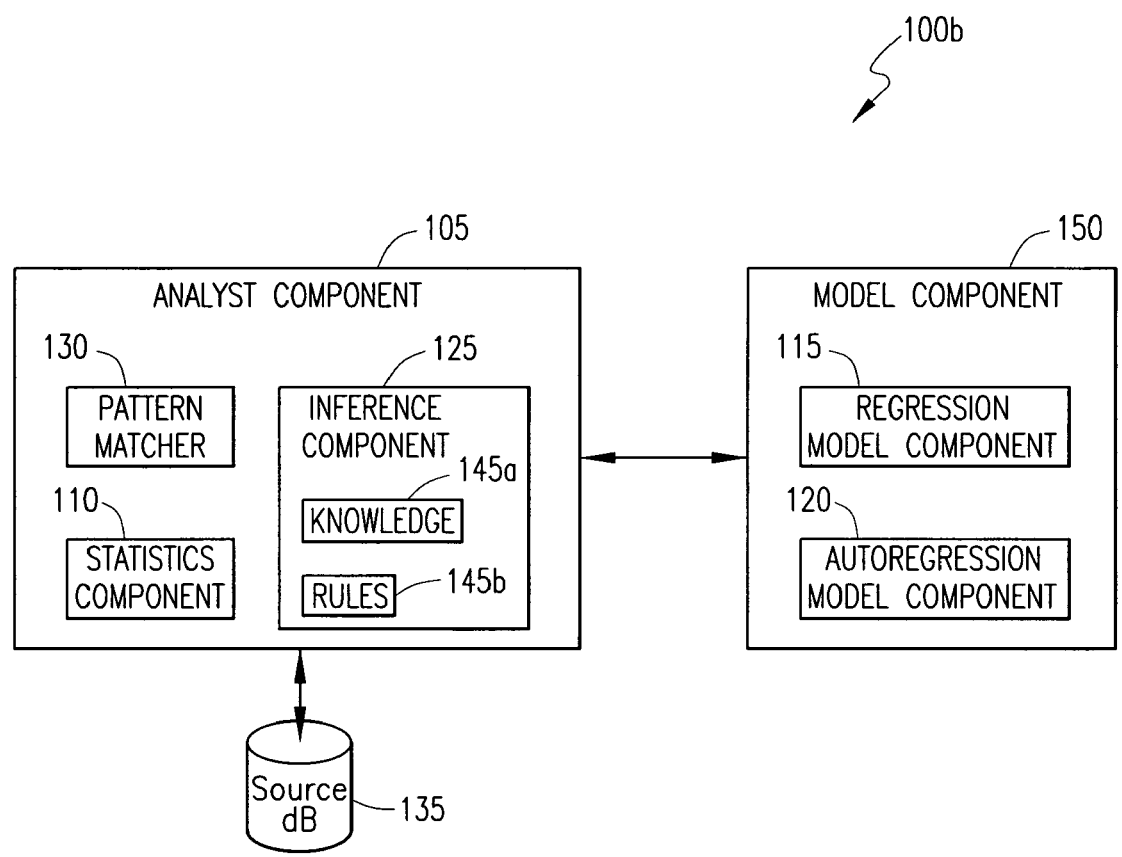
FIG. 1B is another exemplary block diagram of the integrated statistical modeling package according to the principles of the present invention.

FIG. 1B is an alternative embodiment of an integrated statistical modeling package 100b of the integrated statistical modeling package 100a. As shown, the software tools have been reconfigured such that the analyst component 105 includes the statistics component 110, inference engine 125, and pattern matcher 130. The inference engine 125 further is represented as including knowledge 145a and predetermined rules 145b. The analyst component 105 is coupled to a model component 150, where the model component 150 includes the regression model component 115 and the autoregression model component 120. The source database 135 is coupled to the analyst component 105. Although the software tools are configured differently from the software tools of FIG. 1A, operation of the integrated statistical modeling package 100b is substantially the same.

Figure 2:
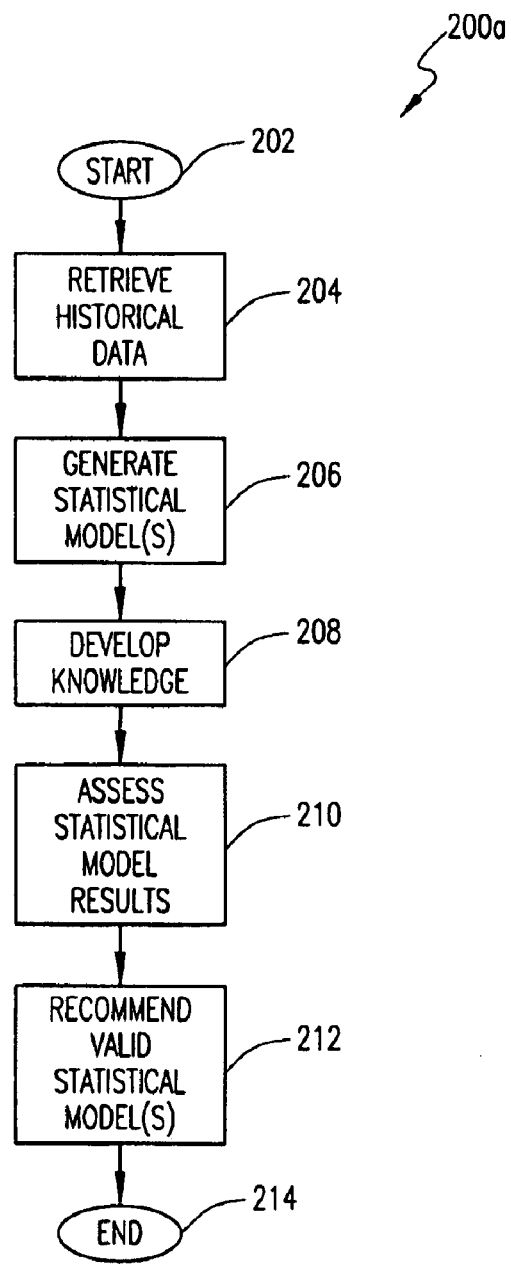
FIG. 2 is an exemplary flow diagram describing operation of the integrated statistical modeling package according to FIGS. 1A and 1B.

FIG. 2 is an exemplary flow diagram 200a for operation of the integrated statistical modeling package 100a. The process starts at step 202. At step 204, historical data is received. The historical data may be any data representing past business events or efforts stored by a business. Statistical models are generated at step 206. At step 208, knowledge, such as facts or assertions, of the historical data may be developed based on the generated statistical models.

At step 210, results of the statistical model(s) are assessed. At step 212, valid statistical model(s) are recommended to a user of the integrated statistical modeling package 100a. In addition to recommending the valid statistical models, a validity or certainty factor may be provided to the user. The certainty factor provides a measure as to how well a valid statistical model may predict future trends based upon the historical data. Finally, at step 214, the process ends.

Figure 3A:
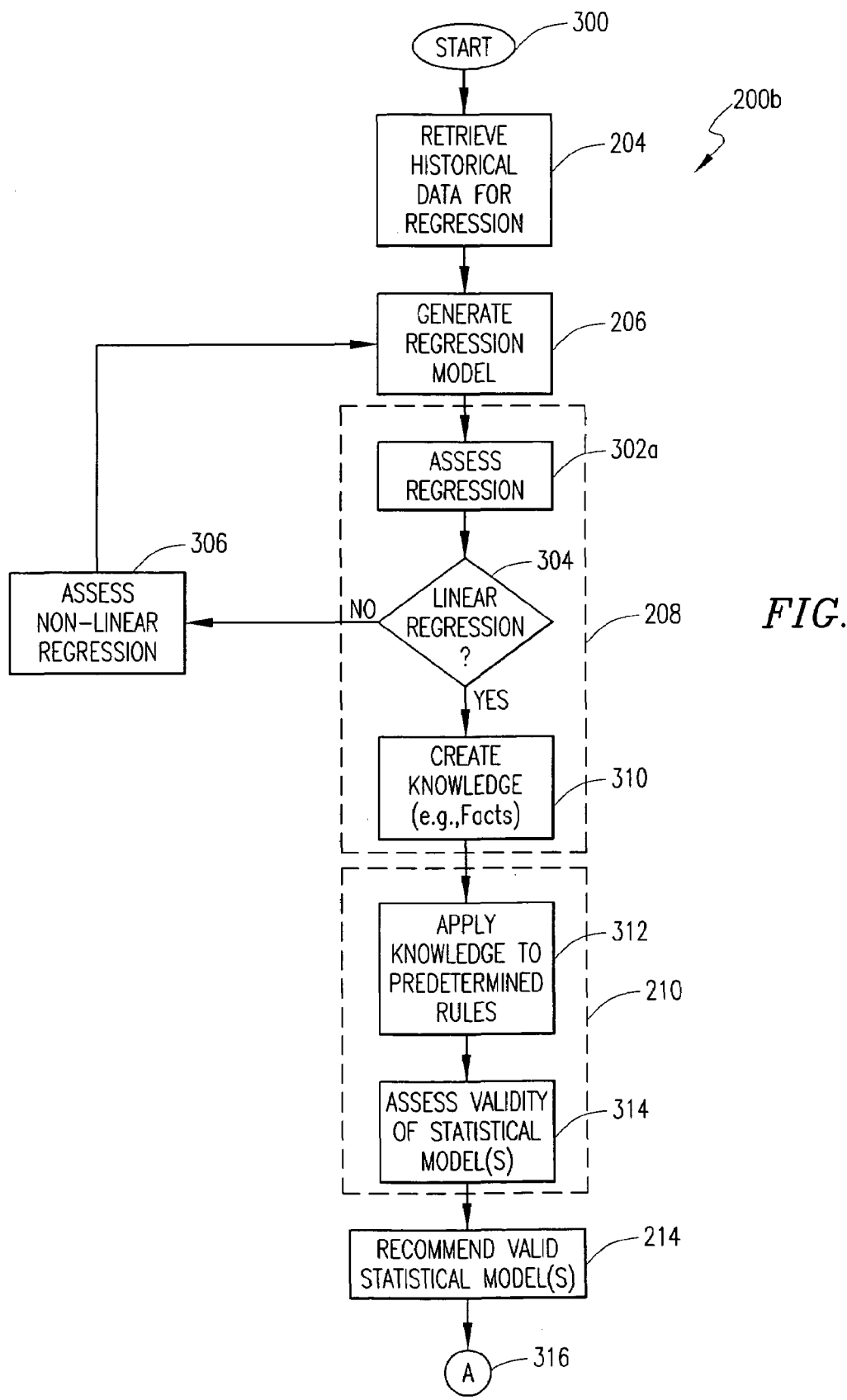
FIGS. 3A and 3B are more detailed flow diagrams describing operation of the integrated statistical modeling package according to FIG. 2.
Figure 3B:
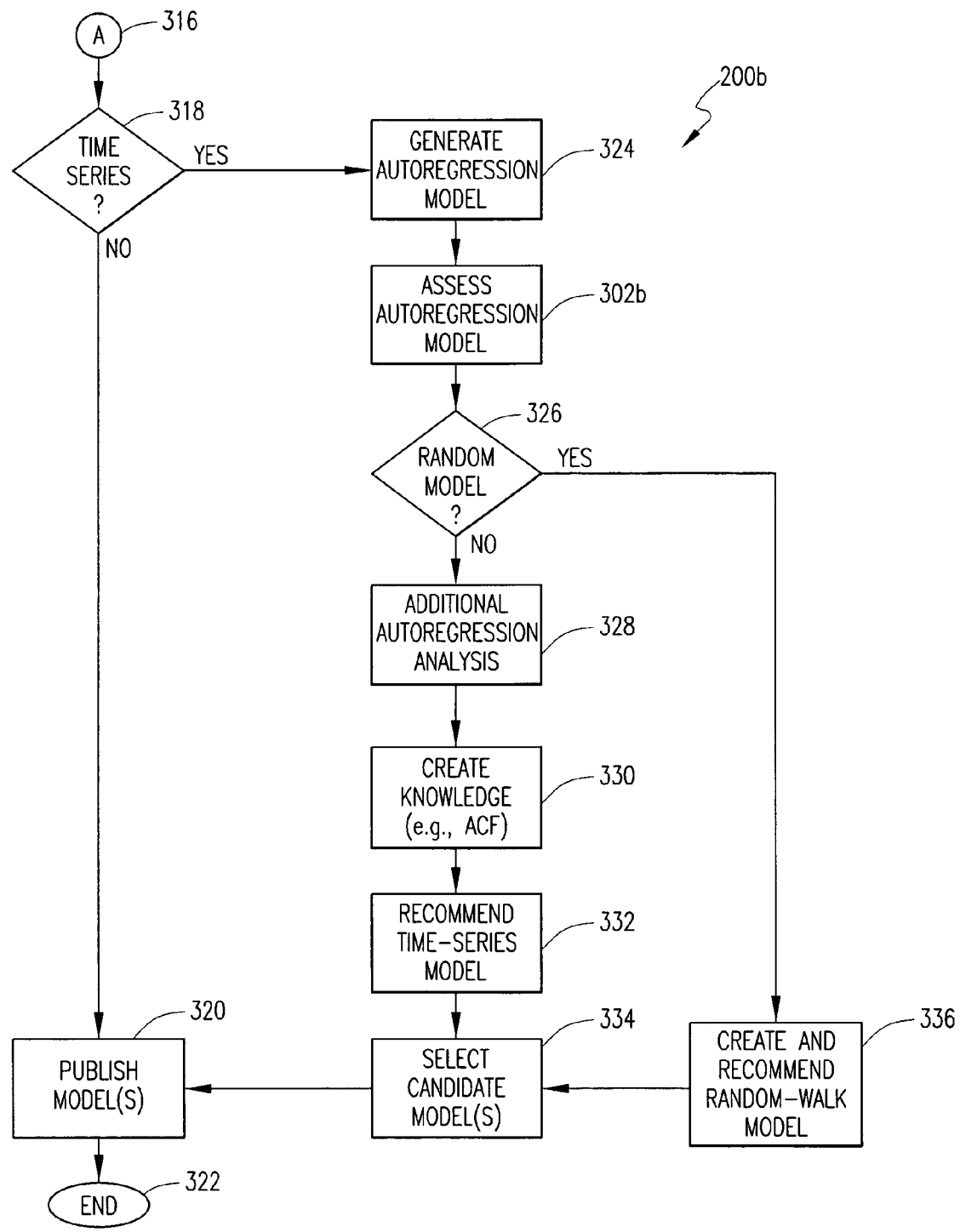

FIGS. 3A and 3B present a more detailed flow diagram 200b of the flow diagram 200A (FIG. 2) of the operation for the integrated statistical modeling package 100a. At step 300, the process starts. At step 204, historical data to be applied to regression analysis is retrieved. A regression model is built at step 206. In a first pass through the process, a linear regression model is generated. Based on the generated linear regression model, knowledge is developed at step 208, which is represented by a dashed line box surrounding steps 302a, 304, and 310.

At step 302a, the regression model is assessed. The assessment includes developing knowledge of regression in generating facts based on the regression results. To generate the facts, a correlation function may be utilized to determine the strength of the correlation between independent and dependent variables. For example, a fact which may state, "For the current regression model, a strong correlation between independent and dependent variables exists." Alternatively, the fact may be numeric or Boolean. At step 304, it is determined whether the linear regression is valid. If the linear regression model is valid, the knowledge is created at step 310. Otherwise, if the linear regression model is not valid, the process of assessing a non-linear aggression model commences. The non-linear regression model is generated at step 206, assessed at step 302a, and knowledge is created therefrom at step 310.

The non-linear regression model is similar to a linear regression model. However, the non-linear regression utilizes non-linear mathematical functions, such as logarithms. Specifically, a linear regression model may be represented as $Y=mX+B$; a non-linear regression model may be $LOG(Y)=a-b(LOG(X))$. It should be understood that the linear and non-linear regression models may be formulated using different equations or functions, but have similar functionality (i.e., performing linear and non-linear regression).

Step 210 from FIG. 2 is shown as a dashed box around steps 312 and 314. At step 312, knowledge developed by step 208 is applied to predetermined rules, which are used to objectively determine validity of the linear and/or non-linear statistical models. At step 314, the validity of the statistical models are assessed. At step 214, valid statistical model(s) are recommended, where the validity or certainty factor may be included with the recommendation of the statistical model(s). At step 316, the process continues into a time-series statistical analysis, which was not included in FIG. 2.

At step 318, a determination is made as to whether a time-series model needs to be generated based upon the validity of the regression analysis. If a time-series analysis does not need to be generated, then the valid statistical model (e.g., linear regression model) is published at step 320. At step 322, the process ends.

If it is determined at step 318 that no linear and non-linear regression models are valid, then an autoregression model is generated at step 324. The autoregression modeling process is a secondary process for determining whether the historical information provides any possible insight or utility for predicting future trends using a time-series analysis. At step 302b, the autoregression model is assessed. The assessment is rule-based and utilizes a coefficient from an autocorrelation of the autoregression model to determine the validity of the autoregression model. At step 326, a determination is made as to whether the autoregression model is valid. In other words, if a time-series of the historical information can be shown to be something other than random, then the autoregression model may be valid.

The process continues at step 328, where additional autoregression analysis is performed. The additional autoregression analysis may include generating additional models, performing other statistical modeling, or performing other assessments. At step 330, knowledge of the autoregression is generated via an autocorrelation function, for example. At step 332, a time-series model is recommended based on the knowledge as applied to the predetermined rules. At step 334, a valid candidate model is selected, and the model is published at step 320.

If at step 326, a determination is made that a random model should be used to model the historical information, then a random-walk model is created and recommended at step 336. At step 334, the random-walk model is selected and published at step 320. It should be noted that a random-walk model is computed as $Y_t = Y_{t-1} + e$. Similar to the linear and non-linear models, alternative random models may be employed to provide similar functionality.

A Box-Pierce Q statistic is used to test for significance of autocorrelation. The Box-Pierce Q statistic is computed as a weighted sum-of-squares of a sequence of autocorrelations. If the errors of the model are white noise, then the Box-Pierce Q statistic distributes approximately as a chi-square distribution with h-m degrees of freedom (where h is the value of the time component where autocorrelation has been tentatively identified and m is the number of parameters of the fitted model; for raw data, m is set to 0). In the case of the integrated statistical modeling package 100a, the number of degrees of freedom coincide with the number of autocorrelations used to calculate the autocorrelation errors.

Figure 4A:
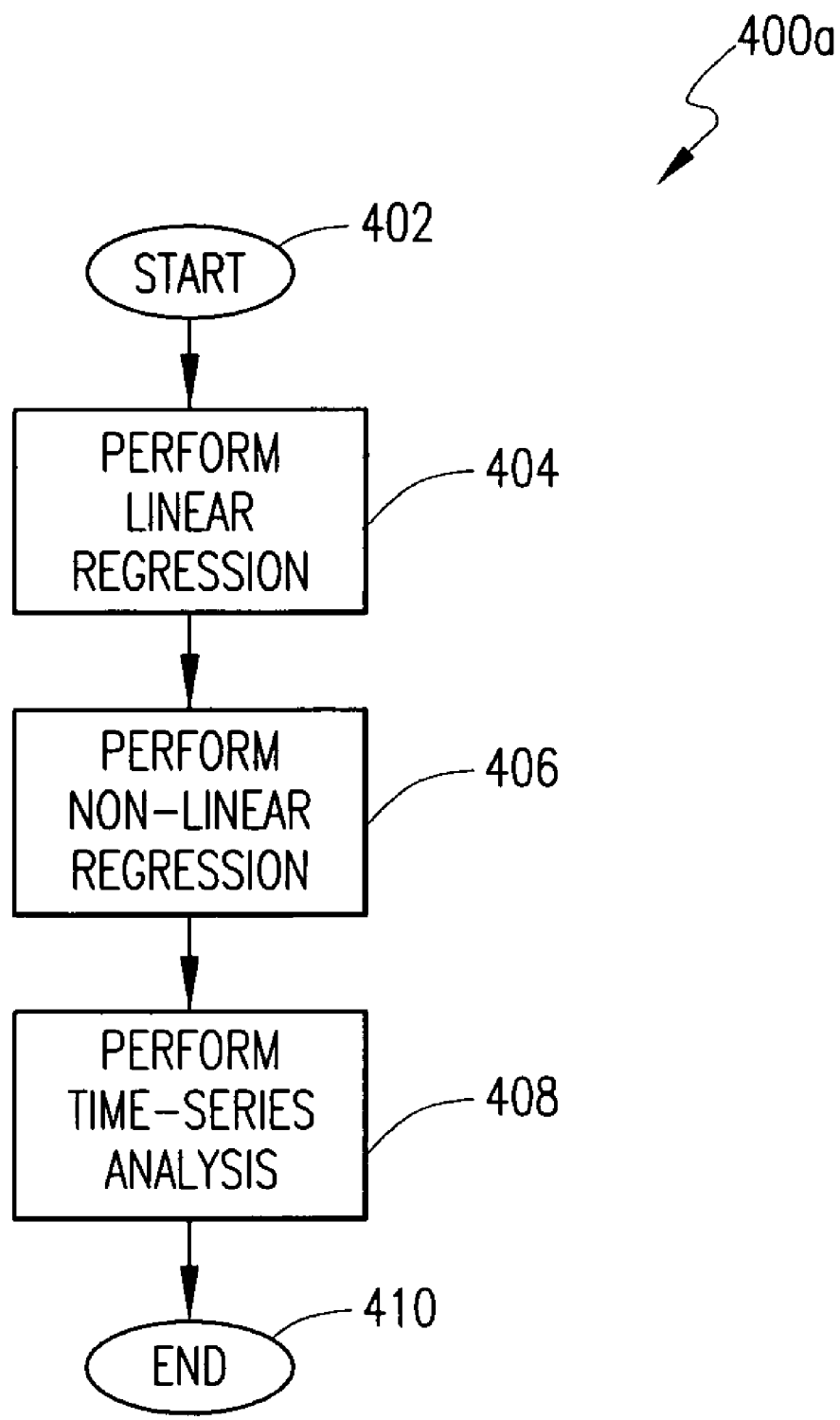
FIG. 4A is a general flow diagram describing basic flow of FIGS. 3A and 3B.

FIG. 4A is a very simplistic overview of the process of FIGS. 3A-3B. Although simplistic, this figure provides a good overview as to the nature of statistical operations of the integrated statistical modeling package 100a. The process 400a starts at step 402. At step 404, a linear regression is performed. At step 406, a non linear regression is performed, and at step 408, a time-series analysis is performed. The process ends at step 410. It should be understood that ordering of the statistical operations may be varied, but that the linear, non-linear, and random ordering is more intuitive.

Figure 4B:
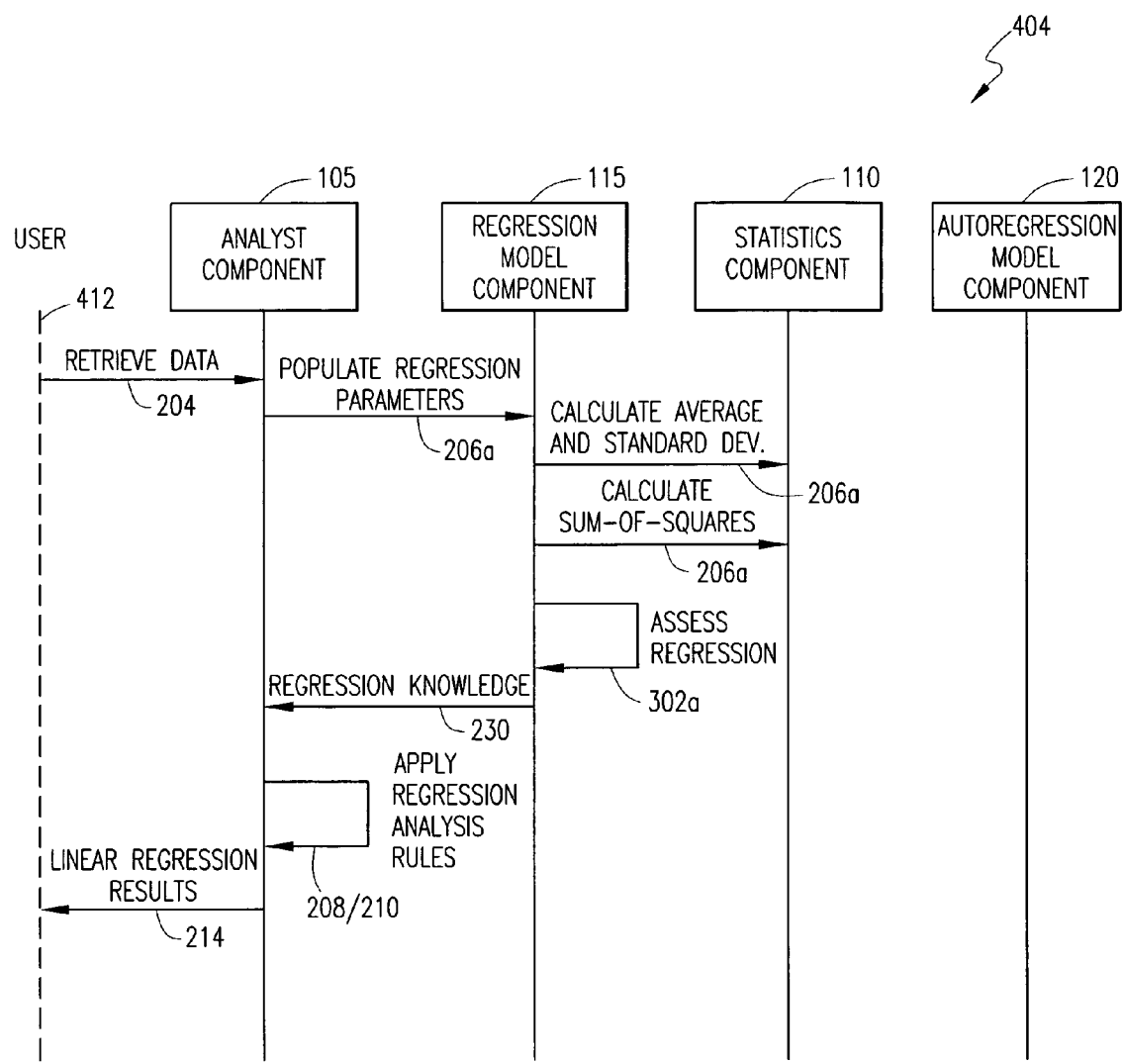
FIGS. 4B-4D are interaction diagrams describing detailed operation of the integrated statistical modeling package according to FIGS. 1A and 1B.
Figure 4C:
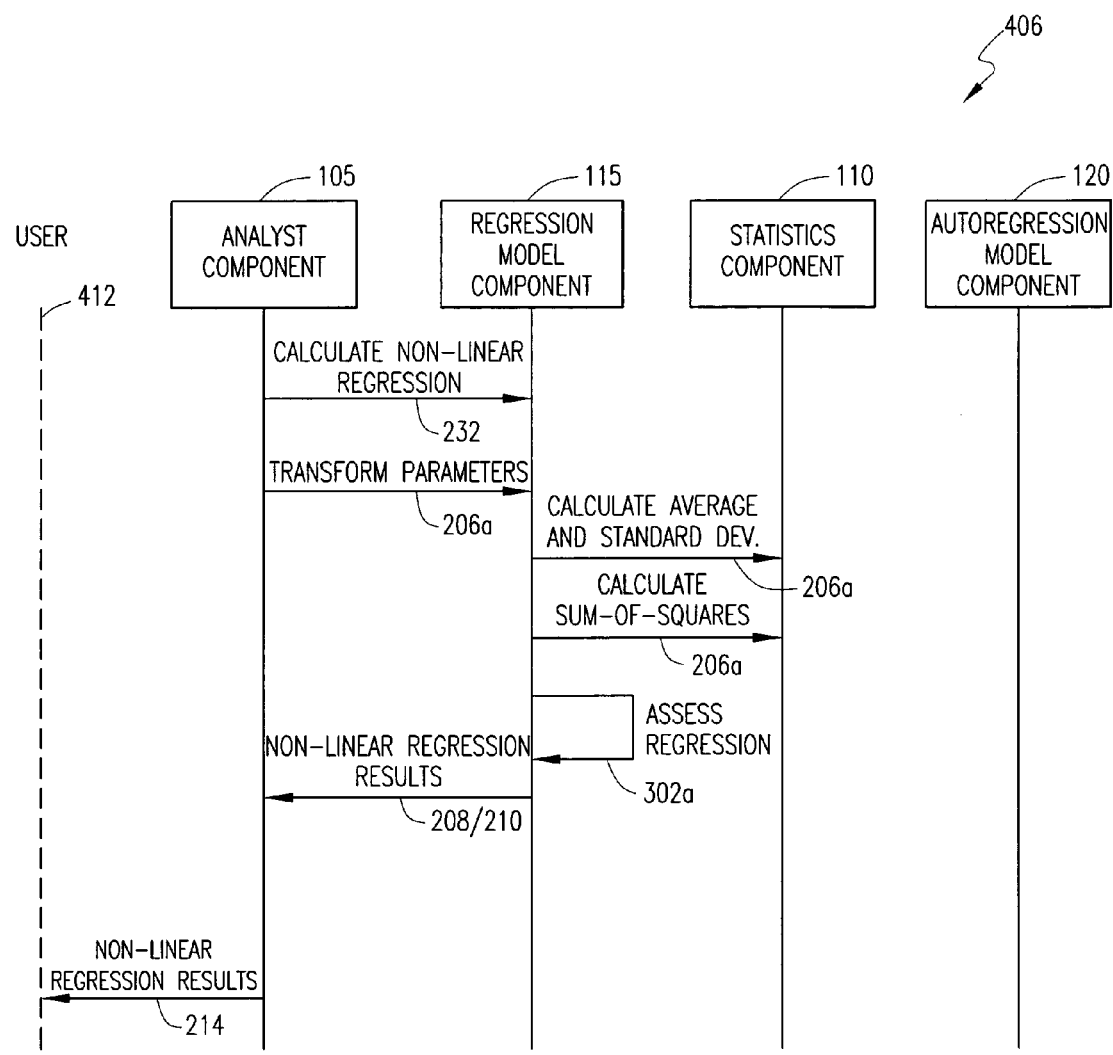

FIG. 4B is a representative communication diagram of the components (e.g., analyst component 105) of the integrated statistical modeling package 100a for performing the linear regression modeling of step 404 (FIG. 4A). As shown, the elements communicating between one another include the analyst component 105, the regression model component 115, the statistics component 110, and the autoregression model component 120. A user 412 of the integrated statistical modeling package 100a is shown as a dashed line.

At step 204, historical data is retrieved by the analyst component 105. The analyst component 115 directs the regression model component 115 to populate regression model parameters at step 206a. Further at step 206a, the regression model component 115, in turn, directs the statistics component 112 to calculate average and standard deviation based on the regression model further at step 206a. Additionally at step 206a, the regression model component 115 directs the statistics component 110 to calculate the sum-of-squares.

At step 302a, the regression model component 115 assesses the regression model by computing correlation and analyzing correlation coefficients. At step 230, the regression model component 115 provides the analyst component 105 with knowledge (e.g., facts and/or assertions) of the linear regression model. The analyst component 105 applies the regression knowledge to the predetermined rules at step 208 and 210. The results of the linear regression are reported to the user 412 by the analyst component 105 at step 214.

The integrated statistical modeling package may automatically perform a non-linear regression analysis at step 406 (FIG. 4A) whether or not the linear regression analysis provides a valid linear regression model. Alternatively, the integrated statistical modeling package 105 may be semi-automated or fully manual to begin the process of determining the non-linear regression model of step 406.

To perform the non-linear regression analysis of step 406, the analyst component 105 directs the regression model component 115 to calculate a non-linear regression model at step 232. The analyst component 105 further directs or commands the regression model component 115 to transform parameters (i.e., historical information) at step 206a. Transformation may be achieved through the use of a logrithmic transformation. Further at step 206a, the regression model component 115 directs the statistics component 110 to calculate the average and standard deviation using the non-linear regression model. Still further at step 206a, the regression model component 115 directs the statistics component 110 to calculate the sum-of-squares for the non-linear regression model.

The regression model component 115 may assess the regression at step 302a by utilizing correlation coefficients or some other results from the model. At step 208 and 210, the non-linear regression results are reported from the regression model component 115 to the analyst component 105, and the analyst component 105 communicates the results of the non-linear regression to the user 412 at step 214.

Figure 4D:
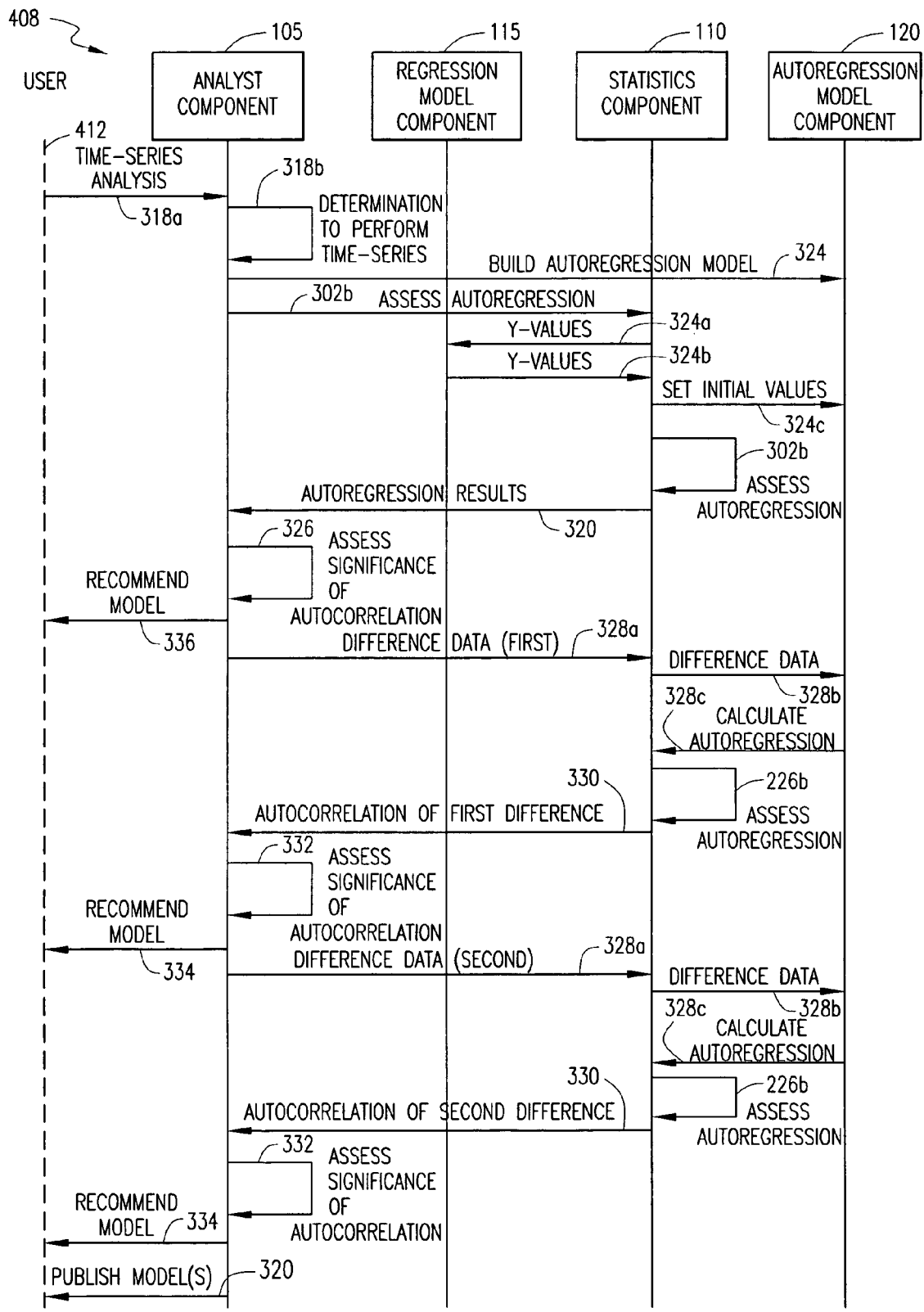

FIG. 4D shows communication between elements of the integrated statistical modeling package 105 for performing the time-series analysis of step 408. The time-series analysis may be automatically, semi-automatically, or manually initiated by the user 412.

At step 318a, initiation of the time-series analysis is provided to the analyst component 105. At step 318b, determination to perform the time-series analysis is made by the analyst component 105. If a time-series analysis is required, then the analyst component 105 directs the autoregression model component 120 to build an autoregression model at step 324. The analyst component 105 additionally directs the statistics component 110 to perform the assessment of the autoregression at step 302b. At 324a, Y-values (i.e., dependent variables) are communicated from the statistics component 110 to the regression model component 115. At step 324b, the statistics component 110 is directed to further compute the Y-values. The statistics component 110 directs the autoregression model component 120 to set initial values for the autoregression at step 324c, which may or may not be used in furtherance of performing the time-series analysis.

At step 302b, the autoregression is assessed by applying the autocorrelation coefficients to the predetermined rules to determine the validity of the time-series model (e.g., autoregression model). The results of the autoregression are communicated from the statistics component 110 to the analyst component 105 at step 320. Significance of the autocorrelation is assessed at step 326 by the analyst component, which may utilize the inference engine 125 to perform this assessment based on predetermined rules. At step 336, the analyst component 105 recommends an autoregression model, if valid, and reports the validity of the autoregression model. If the validity of the auto regression model is not significant (i.e., weakly describes the historical data), then a random-walk model is to be generated.

If it is determined that there is periodicity in the historical data, the Box-Pierce Q statistic is used to determine if there is significance provided by the autocorrelation function. If no significance is found, then a random model is determined. The analyst component 105 provides first difference data of the historical data being analyzed to the statistics component 110 at step 328a. The use of first difference data is to find an alternative trend, such as rate of change, in the historical data. The first difference is simply a remainder produced by subtracting a prior data point from a next data point in a time series. The statistics component 110 forwards the first difference data to the autoregression model component 120 at step 328b. The results of the autoregression calculation at step 328c is provided by the autoregression model component 120 to the statistics component 110. The statistics component 110 assesses the autoregression model and the results of the autocorrelation of the first difference are communicated from the statistics component 110 to the analyst component 105 at step 330.

The significance of the autocorrelation results are assessed by the analyst component 105 at step 332 by applying the correlation coefficients to the predetermined rules. At step 334, if the model is valid, then the autocorrelation model is recommended to the user from the analyst component 105. Additionally, the validity of the model may be reported to the user 412.

Steps 328a-334 are repeated, except that rather than utilizing first difference data, second difference data is used to perform the autocorrelation model. The second difference data is simply a subtraction of successive data elements of the first difference data. By using the second difference data, alternate trends, such as direction of rate of change, in the historical data may be found by the autoregression and autocorrelation functions.

Figure 5:
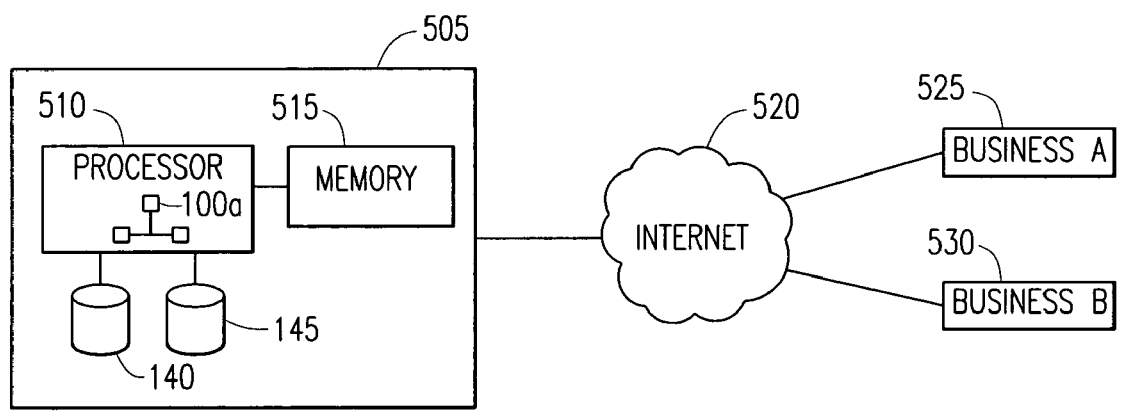
FIG. 5 is a system block diagram capable of executing the integrated statistical modeling package according to FIGS. 1A-4D.

FIG. 5 shows an exemplary network 500 that includes a computer system 500 for operating the integrated statistical modeling package 100a. The computer system 505 may be a server or a personal computer. It should be understood that the computer system 505 may be a standalone system not connected and not part of a network 500.

The computer system 505 includes a processor 510 coupled to a memory 515 and two databases, the source database 140 and the rules database 145. The computer system may be connected to a local, wide area, or global network, such as the Internet 520. Two businesses, business A and business B, may be further connected to the Internet 520.

In operation, the processor 510 reads instructions from a floppy disk, hard disk, or optical disk, for example, that form the integrated statistical modeling package 100a. The integrated statistical modeling package 100a may be read into the memory 515 and executed by the processor 510. The integrated statistical modeling package 100a may read data stored in the databases 140 and 145 or, alternatively, read from remote database(s) from businesses A and B, for example, that include historical information. By being able to read from remote locations, an operator of the integrated statistical modeling package 100a may operate as a service provider rather than simply an in-house analyst.

It should be understood that the integrated statistical modeling package 100a may be a stand-alone system or treated as software tools as part of a larger software system. For example, a large business may utilize a system including an accounting package or other business assessment package for managers of the business to track and account for business operations. The integrated statistical modeling package 100a may be included as a subset or part of the accounting software package used by the business managers. As such, the managers or other personnel, such as statisticians, may select an assessment or forecasting tool in the larger software package that initiates the integrated statistical modeling package 100a. The integrated statistical modeling package 100a may utilize the software tools and historical data stored by the larger software package and apply the statistical modeling and analysis as described herein.

The previous description is of a preferred embodiment for implementing the invention, and the scope of the invention should not necessarily be limited by this description. The scope of the present invention is instead defined by the following claims.

What is claimed is:

1. A method for assessing business activities, the method comprising:
   retrieving historical data associated with a business activity, wherein the historical data comprises at least two parameters;
   generating at least one statistical model based on the historical data, the generating step comprising performing regression analysis to discover the existence of correlations between the at least two parameters;
   utilizing a correlation function to determine a level of confidence for each of the correlations;
   creating knowledge, the knowledge comprising facts and assertions, based on the generated at least one statistical model;
   applying the knowledge using at least one predetermined rule, the step of applying comprising determining whether the level of confidence is higher than a pre-defined correlation coefficient value, wherein a statistically valid correlation exists between the at least two parameters if the determined level of confidence is higher than the pre-defined correlation coefficient value;
   assessing validity of the at least one statistical model based on said applying of the knowledge using the at least one predetermined rule, wherein the step of assessing the validity comprises determining a certainty factor that provides a measure of how well the valid statistical model may predict future trends based upon the historical data;
   responsive to an assessment of validity of the at least one statistical model, recommending the at least one statistical model to a user;
   wherein the recommending step comprises providing the certainty factor to the user; and
   responsive to determining that the at least one statistical model is not valid, automatically generating a second statistical model.

2. The method according to claim 1, further comprising:
   applying the recommended at least one statistical model to generate at least one of the following:
   assessment data representative of the business activity, and
   prediction data representative of a projected business activity.

3. The method according to claim 1, wherein the at least one statistical model includes at least one of the following:
   linear regression, non-linear regression, and time-series.

4. The method according to claim 3, wherein the time-series model includes a random-walk model.

5. The method according to claim 1, wherein said generating at least one statistical model includes:
   first, generating a linear regression model;
   second, generating a non-linear regression model; and
   third, generating a time-series model.

6. The method of claim 1, further comprising: automatically adjusting the statistical model after a user-specified time period.

7. A system for assessing business activities, the system comprising:
   a database for storing historical data associated with a business activity, wherein the historical data comprises at least two parameters;

a computer-readable medium having stored thereon sequences of instructions;

a processor coupled to said database and said computer-readable medium, said processor executing the sequences of instructions and causing the processor to:

generate at least one statistical model based on the historical data, the generation comprising performing regression analysis to discover the existence of correlations between the at least two parameters;

utilize a correlation function to determine a level of confidence for each of the correlations;

create knowledge, the knowledge comprising facts and assertions, based on the generated at least one statistical model;

apply the knowledge using at least one predetermined rule, the application comprising determining whether the level of confidence is higher than a pre-defined correlation coefficient value, wherein a statistically valid correlation exists between the at least two parameters if the determined level of confidence is higher than the pre-defined correlation coefficient value;

assess validity of the at least one statistical model based on develop knowledge based on said application of the knowledge using the at least one predetermined rule to assess assess validity of the at least one statistical model based on said applying of the at least one predetermined rule;

wherein the assessment of the validity comprises determining a certainty factor that provides a measure of how well the valid statistical model may predict future trends based upon the historical data;

responsive to an assessment of validity of the at least one statistical model, recommend the at least one statistical model to a user;

wherein the recommendation comprises providing the certainty factor to the user; and responsive to a determination that the at least one statistical model is not valid, automatically generate a second statistical model.

8. The system according to claim 7, wherein said processor further:

applies the recommended at least one statistical model to generate at least one of the following:
assessment data representative of the business activity, and
prediction data representative of a projected business activity.

9. The system according to claim 7, wherein the at least one statistical model includes at least one of the following: linear regression, non-linear regression, and time-series.

10. The system according to claim 9, wherein the time-series model includes a random-walk model.

11. The system according to claim 7, wherein said generation of the at least one statistical model includes:
first, generation of a linear regression model;
second, generation of a non-linear regression model; and
third, generation of a time-series model.

12. The system of claim 7, wherein the processor automatically adjusts the statistical model after a user-specified time period.

13. An article of manufacture for assessing business activities, the article of manufacture comprising:

at least one computer readable medium;

processor instructions contained on the at least one computer readable medium, the processor instructions configured to be readable from the at least one computer readable medium by at least one processor and thereby cause the at least one processor to operate as to:

retrieve historical data associated with a business activity, wherein the historical data comprises at least two parameters;

generate at least one statistical model based on the historical data, the generation comprising performing repression analysis to discover the existence of correlations between the at least two parameters;

utilize a correlation function to determine a level of confidence for each of the correlations;

create knowledge, the knowledge comprising facts and assertions, based on the generated at least one statistical models;

apply the knowledge using at least one predetermined rule, the application comprising determining whether the level of confidence is higher than a pre-defined correlation coefficient value, wherein a statistically valid correlation exists between the at least two parameters if the determined level of confidence is higher than the pre-defined correlation coefficient value;

an analyst component coupled to said statistics component, said analyst component initiating said statistics component to perform the statistical analysis on the historical data;

an inference engine coupled to said analyst component;

a database including at least one rule, the at least one rule being applied by said inference engine to assess validity of the at least one statistical model based on the application of the knowledge using the at least one predetermined rule, wherein the assessment of the validity comprises determining a certainty factor that provides a measure of how well the valid statistical model may predict future trends based upon the historical data;

responsive to an assessment of validity of the at least one statistical model, recommend the at least one statistical model to a user;

wherein the recommendation comprises providing the certainty factor to the user; and responsive to a determination that the at least one statistical model is not valid, automatically generate a second statistical model.

14. The article of manufacture according to claim 13, wherein said at least one statistical model includes at least one of the following:
linear regression, non-linear regression, and time series.

15. The article of manufacture of claim 13, further comprising processor instructions contained on the at least one computer readable medium, the processor instructions configured to be readable from the at least one computer readable medium by at least one processor and thereby cause the at least one processor to operate as to automatically adjust the statistical model after a user-specified time period.

* * * * *

UNITED STATES PATENT AND TRADEMARK OFFICE
CERTIFICATE OF CORRECTION

| | | |
|---|---|---|
| PATENT NO. | : 7,236,940 B2 | Page 1 of 1 |
| APPLICATION NO. | : 09/859320 | |
| DATED | : June 26, 2007 | |
| INVENTOR(S) | : Oscar A. Chappel | |

It is certified that error appears in the above-identified patent and that said Letters Patent is hereby corrected as shown below:

COLUMN 11, CLAIM 7, LINES 22-27

Replace "assess validity of the at least one statistical model based on develop knowledge based on said application of the knowledge using the at least one predetermined rule to assess assess validity of the at least one statistical model based on said applying of the at least one predetermined rule;"

With --assess validity of the at least one statistical model based on the historical data; develop knowledge based on said application of the knowledge using the at least one predetermined rule to assess validity of the at least one statistical model based on said applying of the at least one predetermined rule;--

COLUMN 12, CLAIM 13, LINE 12

Replace "repression"
With --regression--

COLUMN 12, CLAIM 13, LINE 18

Replace "models"
With --model--

Signed and Sealed this

Twentieth Day of January, 2009

JON W. DUDAS
*Director of the United States Patent and Trademark Office*